United States Patent Office 2,872,982
Patented Feb. 10, 1959

2,872,982

METHOD FOR IMPROVING PRODUCTION OF OIL WELLS

Robert C. Wade, Ipswich, Mass., assignor to Metal Hydrides Incorporated, Beverly, Mass., a corporation of Massachusetts No Drawing. Application August 1, 1957
Serial No. 675,546

2 Claims. (Cl. 166—38)

This invention relates to a method for improving the efficiency of oil recovery operations in oil wells in which the flow of oil from the oil-bearing formation into the well is too slow, due either to its natural formation or because the interstices or pores of the oil-bearing formation have become clogged.

Most wells when brought in flow freely. However, when the formation pressure becomes reduced, pumping must be resorted to in order to produce oil in commercial quantities. As soon as the passage of oil from the oil-bearing formation slows up, paraffinic, asphaltic, resinous or other organic or inorganic substances settle from the oil and tend to clog the interstices or pores of the oil-bearing formation portion of the well.

Methods have been proposed heretofore for loosening and removing the substances clogging the pores of the oil-bearing formation to increase the flow of oil from the oil-bearing formation into the well. Thus, it has been proposed to fill the oil-bearing formation surrounding an oil well with water and introduce a column of oil upon the water. Sodium or a sodium alloy then was dropped through the oil into the water and the top of the well capped. The sodium reacted with the water to form sodium hydroxide and hydrogen gas. This reaction being exothermic increased the temperature of the aqueous sodium hydroxide solution sufficiently to melt the paraffinic or resinous substances clogging the pores. The hydrogen generated created a top pressure which, with the hydrostatic head provided by the column of oil, tended to force the hot alkali solution into the oil-bearing formation surrounding the well. The hot alkaline solution was permitted to remain in the well for a substantial time, but preferably not more than one hour, to avoid cooling the alkaline solution to a point where the paraffin was again precipitated. The alkaline solution then was pumped or bailed out. After the reaction products had been removed from the well, the regular pumping equipment was installed and the well operated in the usual manner.

In accordance with the method of the present invention, the interstices or pores of the oil-bearing formation surrounding the well are impregnated with a solution of an alkali metal borohydride, such as sodium, potassium or lithium borohydride, and then the alkali metal borohydride in the pores is decomposed, preferably by contact with an acid, to generate a pressure of hydrogen therein and thereby loosen and forcibly remove from the pores the substances clogging the same.

Sodium borohydride in aqueous solution is especially suitable for use in the practice of the present invention. Sodium borohydride is soluble in water to the extent of 4.4 pounds per gallon of water at 25° C. These solutions are stable in alkaline water solutions at a pH of 9 or higher but when treated with acid evolve 38 cubic feet of hydrogen per pound of sodium borohydride. An aqueous solution containing about 10 percent sodium borohydride and 35 to 40 percent sodium hydroxide by weight and the balance water is especially suitable. If desired, from 1 to 5 percent by weight of a wetting agent may be incorporated in the alkali metal borohydride solution to assist the penetration of the solution into the pores of the oil-bearing formation. The heat of neutralization generated when acids are added to the alkaline solution is of further advantage in increasing the penetration of the aqueous solutions and in melting and emulsifying the paraffins, asphalts and resins clogging the pore structure.

In accordance with the present preferred practice of the invention, a stable aqueous solution of sodium borohydride is introduced into the oil well in an amount at least sufficient to contact substantially all the oil-bearing formation surrounding the well. Oil then is introduced to provide a column of oil sufficient to impose a substantial pressure upon the aqueous solution. An acid, preferably a mineral acid because of its low cost, then is introduced into the aqueous solution in an amount sufficient to decompose only a portion of the sodium borohydride and the well is capped or closed at the top. The reaction of the acid with the borohydride generates hydrogen and creates a pressure over the oil column which, with the hydrostatic head provided by the oil column, tends to force the aqueous solution of sodium borohydride into the oil-bearing formation surrounding the well. The hydrogen pressure is vented off and the top of the well opened. Sufficient acid then is introduced to contact and react with the sodium borohydride in the pores of the oil-bearing formation and generate hydrogen under great pressure within the pores to loosen and forcibly remove the substances clogging the pores and in some instances to enlarge the interstices or pores. The aqueous solution and oil then are pumped or bailed out and the well is ready for operation in the usual manner.

I claim:

1. The method of treating oil wells which comprises introducing a solution of an alkali metal borohydride into the well in an amount at least sufficient to contact substantially all the oil-bearing formation surrounding the well, introducing oil into the well to provide a column of oil superimposed on said solution, introducing into the well an amount of acid sufficient to decompose a portion only of the alkali metal borohydride and thereby generating a substantial volume of hydrogen, trapping the generated hydrogen above and in contact with said column of oil, thereby imposing substantial pressure upon said solution and causing said solution to penetrate into and impregnate the pores of said oil-bearing formation, and thereafter introducing acid to react with the alkali metal borohydride in said pores to generate hydrogen therein and thereby loosen and forcibly remove from the pores substances clogging the same.

2. The method as claimed by claim 1, wherein the solution of an alkali metal borohydride is an aqueous solution of sodium borohydride.

References Cited in the file of this patent

UNITED STATES PATENTS

| | | |
|---|---|---|
| 2,001,350 | Mills | May 14, 1935 |
| 2,534,533 | Schlesinger | Dec. 19, 1950 |
| 2,748,867 | Lissant | June 5, 1956 |